US012641516B2

(12) United States Patent
Gopal et al.

(10) Patent No.: US 12,641,516 B2
(45) Date of Patent: May 26, 2026

(54) SMART NETWORK EDGE FOR HYBRID SPACE AND TERRESTRIAL CONNECTIVITY

(71) Applicant: Hughes Network Systems, LLC, Germantown, MD (US)

(72) Inventors: Rajeev Gopal, North Potomac, MD (US); Channasandra Ravishankar, Clarksburg, MD (US); Xiaoling Huang, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 333 days.

(21) Appl. No.: 18/345,089

(22) Filed: Jun. 30, 2023

(65) Prior Publication Data

US 2024/0089823 A1     Mar. 14, 2024

Related U.S. Application Data

(60) Provisional application No. 63/406,033, filed on Sep. 13, 2022.

(51) Int. Cl.
*H04B 7/185*        (2006.01)
*H04W 40/16*        (2009.01)

(52) U.S. Cl.
CPC ........ *H04W 40/16* (2013.01); *H04B 7/18513* (2013.01)

(58) Field of Classification Search
None
See application file for complete search history.

(56) References Cited

U.S. PATENT DOCUMENTS 6,337,659 B1 * 1/2002 Kim .......................... H01Q 3/30
                                                        342/373
8,116,763 B1 * 2/2012 Olsen .................... H04W 16/28
                                                        455/445

OTHER PUBLICATIONS

International Search Report and Written Opinion of the International Searching Authority mailed Jan. 15, 2024 for International Patent Application No. PCT/US2023/032269 (9 pages).
Ravishankar et al., "Next-generation global satellite system with mega-constellations", International Journal of Satellite Communications and Networking, vol. 39, No. 1, Jul. 24, 2020, pp. 6-28.

* cited by examiner

*Primary Examiner* — Minh Trang T Nguyen
(74) *Attorney, Agent, or Firm* — NovoTechIP International PLLC

(57)        ABSTRACT
A smart network edge (SNE) selectively mutes data packets via an optimal data path using available networks, either terrestrial or non-terrestrial. The SNE includes: a processor; a memory storing programming for the processor, a steerable antenna; and a number of modems corresponding to gateways in the available networks. The SNE is programmed to determine one or more selected data paths for data packets of a session based on avoiding or mitigating inter-constellation interference.

20 Claims, 10 Drawing Sheets

SMART NETWORK EDGE FOR HYBRID SPACE AND TERRESTRIAL CONNECTIVITY

BACKGROUND

A variety of different systems carry data and communication from a local to a global scale. On the local scale, the standards of the Third Generation Partnership Project (3GPP), including 5G, provide mobile wireless networks that support mobile phones, computers and other devices for all types of data. These networks utilize the physical infrastructure of the internet as well as radio towers for wireless coverage. In addition to these terrestrial networks, a variety of non-terrestrial data networks add to a global data communications system. For example, 3GPP has been actively involved in the development of Non-Terrestrial Transport networks that include satellites. There are also satellite communication systems with satellites in Low Earth Orbit (LEO), Medium Earth Orbit (MEO) and Geosynchronous Earth Orbit (GEO)

Different types of networks have different advantages and disadvantages. For example, several Low Earth Orbit (LEO) systems are being deployed that provide low latency to end-users. In Geosynchronous Earth Orbit (GEO), Very High Throughput Satellite (VHTS) systems are being deployed that maximize capacity density.

With such a variety of systems deployed with different advantages and disadvantages, no single technology is able to provide an optimal solution in terms of latency, throughput, efficiency, coverage, capacity, density and availability for all applications, user terminal types and use cases. Thus, methods of utilizing existing systems in tandem that maximize the advantages of each are of great interest.

SUMMARY

The following description provides a Smart Network Edge (SNE) that intelligently utilizes multiple communication systems to optimize the advantages available depending on the type of data being transmitted.

In one general aspect, the following description presents a smart network edge (SNE) selectively routes data packets via an optimal data path using available networks, either terrestrial or non-terrestrial. The SNE includes: a processor, a memory storing programming for the processor; a steerable antenna; and a number of modems corresponding to gateways in the available networks. The SNE is programmed to determine a selected data path for data packets of a session based on avoiding or mitigating inter-constellation interference.

In another general aspect, the following description presents a smart network edge (SNE) for selectively routing data packets via an optimal data path using available networks includes: a processor, a memory storing programming for the processor, a steerable antenna; a Radio Resource Control for gateways (RRC-G); and a Radio Resource Control for direct sessions (RRC-D). The SNE is programmed to use the RRC-G to obtain allocation of network resources for a direct session between two user terminals and the RRC-D to conduct the direct session. In the direct session, the SNE routes the data packets between the two user terminals via a satellite network and avoiding any a terrestrial gateway.

In another general aspect, the following description presents a method for selectively routing data packets via an optimal data path using available networks, either terrestrial or non-terrestrial, with a Smart Network Edge (SNE). The SNE includes a processor, a memory storing programming for the processor, a steerable antenna and a number of modems corresponding to gateways in the available networks. The method includes: determining potential for inter-constellation interference when communicating with a first satellite in a first constellation by a second satellite in a second constellation; and selecting a data path for the data packets of a session based on avoiding or mitigating the inter-constellation interference.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
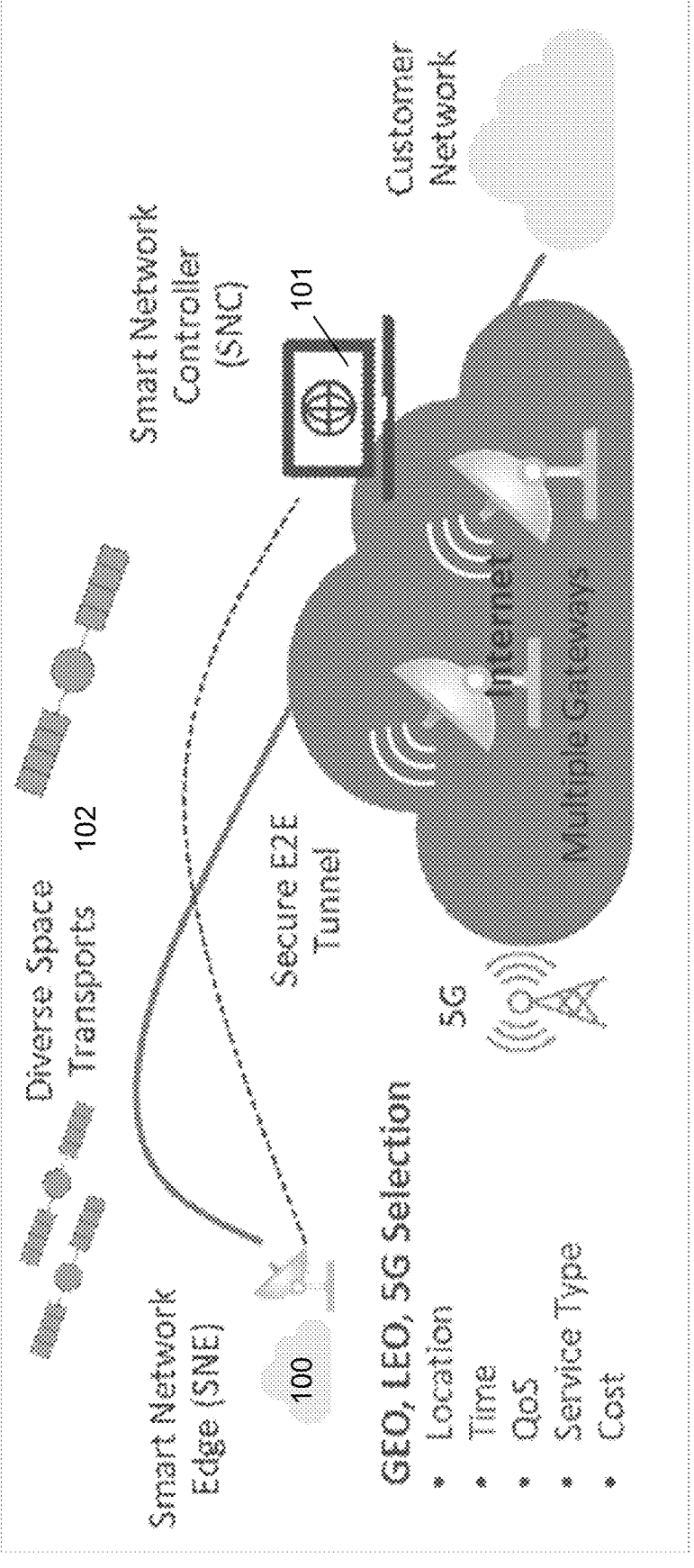
FIG. 1 illustrates an example system incorporating Multi-orbit smart edge for resiliency and efficiency.

As noted above, no single technology is able to provide an optimal solution in terms of latency, throughput, efficiency, coverage, capacity, density and availability for all applications, user terminal types and use cases. Consequently, there is an increased interest in the deployment and use of hybrid architectures to benefit the end-user community. Specifically, there is a need for a hybrid architecture that uses a combination of LEO, GEO and Terrestrial communication systems that optimizes in all the variables listed above based on the needs of the data type being transmitted. Further, there is a need for a user terminal with multiple radio access technologies and smart logic that determines the best path for a session as described herein. As used herein and in the appended claims, the term "data path" or "path" refers to the selected network (terrestrial, satellite or a combination of both) including corresponding modems, gateways, agents and other components, through which data packets are routed from a source to a destination.

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

With the recent deployment of LEO broadband services by, for example. OneWeb and Starlink. and 3GPP inclusion of Non-terrestrial Transport (NTN), the satellite communications field is experiencing disruptive innovations at an unprecedented pace. Both technical and business focus have rapidly shifted to a hybrid environment where appropriate space—LEO and incumbent Geosynchronous Orbits (GEO)—and terrestrial wireless technologies (e.g., 5G from 3GPP) can be selectively applied to meet diverse connectivity needs worldwide.

GEO-based communications systems, especially with High Throughput Satellites (HTS), utilizing multiple beams for spectral reuse, have achieved high-capacity density with low cost per bit. GEO terminals on the edge are affordable because of the latest digital and software technologies and the ability to use fixed parabolic antennas for most applications. Streaming video and multimedia on the web, however, have emerged as the primary GEO user traffic types.

LEO systems that have recently started operating offer significantly lower latency that expands their use for delay sensitive applications, such as gaming, active control, and financial transactions. By design, LEO systems have global coverage, which incurs significant satellite development and launch costs. Another cost driver, especially for consumer level Internet access, is the need to have a satellite tracking antenna at the network edge with Size, Weight. Power, and Cost (SWaP-C) challenges. Recent innovations with Electronically Steered Antennas (ESAs) have started tackling this challenge. Low SWaP-C ESA, low latency, and global coverage are key to rapid LEO progress.

The terrestrial wireless ecosystem, under the auspices of 3GPP, has led the cellular industry into its fifth generation with very high data rates, low latency, and low equipment cost because of the Economies of Scale (EoS). However, universal coverage, especially in areas with low population density or lack of affordability, is a major issue and can be mitigated with the introduction of NTN technologies within the 3GPP framework. 3GPP has also been leveraged in the design of some LEO satellite systems, such as OneWeb, which helps with increased ease of transport integration. A unique 3GPP contribution is the standardization of edge cloud as Multi access Edge Compute (MEC) capability to leverage local compute and storage capabilities.

FIG. 1. illustrates a Smart Network Edge 100 in an operating environment. A SNE, as described herein, may be implemented in a Very Small Aperture Terminal (VSAT). A VSAT is a small-sized terrestrial station used to transmit/ receive one of data, voice, and video signals over a satellite communication network. A VSAT consists of two parts: a transceiver placed outdoors in direct line of sight to the satellite, and a device that is placed indoors to interface the transceiver with the end user's communications device, such as a personal computer. The transceiver receives or sends a signal to a satellite constellation in the sky, as shown in FIG.

1. The satellite sends and receives signals from a Smart Network Controller (SNC) 100 that acts as a hub for the system. Each end user is interconnected with the SNC 100 via the satellite, forming a star topology. The SNC 100 controls the entire operation of the network. For one end user to communicate with another, each transmission must first go to the SNC 100, which then retransmits it via the satellite constellation(s) 102 to the other end user's VSAT. VSAT systems operate in Ku-band, C-band and Ka-band frequencies.

A Smart Network Edge (SNE) benefits from the transformational capabilities of MEC in hosting next-generation applications. To optimize across edge equipment cost, per-bit operational cost, capacity density, coverage, and EoS, a smart edge capability that can dynamically leverage the right set of transports is needed (see FIG. 1). Proof-of-concept prototyping has been done toward smart edge implementation across GEO satellites (for various service providers) and Software-Defined WAN (SD WAN) with GEO/LEO. A low SWaP-C edge connectivity solution that fully addresses the divergent technical and affordability factors associated with hybrid networks is described herein.

Smart edge requires a low SWaP-C approach while it is being implemented across multiple network layers/planes and business arrangements. At the physical layer, the solution requires addressing traditional communications topics, such as RF link management (acquisition, tracking, directivity). Doppler correction, coding, modulation, and media access control. With a hybrid network objective, multiple system operators and service providers also need to be integrated at the network, service, and business layers. With 3GPP, significant interoperability is possible across all layers, but for both GEO and LEO, almost all layers and planes have traditionally been proprietary or used customized standards, and significant protocol-level development or an innovative integration approach is required between the edge and centralized infrastructure (gateway, management systems) to realize a unified solution.

TABLE 1

| Existing Landscape for Smart Communications Edge | | | |
|---|---|---|---|
| Function | GEO | LEO | Smart Edge |
| Antenna | Parabolic (steered) | ESA | ESA |
| Antenna Control | OpenAMIP | Proprietary | OpenAMIPleo |
| Intermediate Frequency (IF) | L-band | Proprietary | Extended L with Digital IF |
| PHY | DVB-S2 | Proprietary | Reuse |
| MAC | Proprietary | Proprietary | Reuse |
| Network | IP | IP | IP |
| Management | SNMP, REST | SNMP, REST | SNMP REST |
| Management Data Models | Limited | Limited | Translation Engine |
| Resiliency | N/A | N/A | SD-WAN |

Cellular (e.g., 5G) edge, though not shown in the table, can be similarly accommodated. The use of high mmWave band for cellular requiring directional connectivity is most relevant from this perspective. SNE is a software-centric approach for realizing this multi orbit and hybrid space-terrestrial harmonization to create significant cost and performance value for enterprise customers. This segment includes multinationals, exploration, mining, manufacturing, governments, airline, and shipping companies, which benefit from SNE across all design drivers. Even consumers sharing a common wide area link (backhaul for cellular system in developing country villages) can also benefit from SNE.

Figure 2:
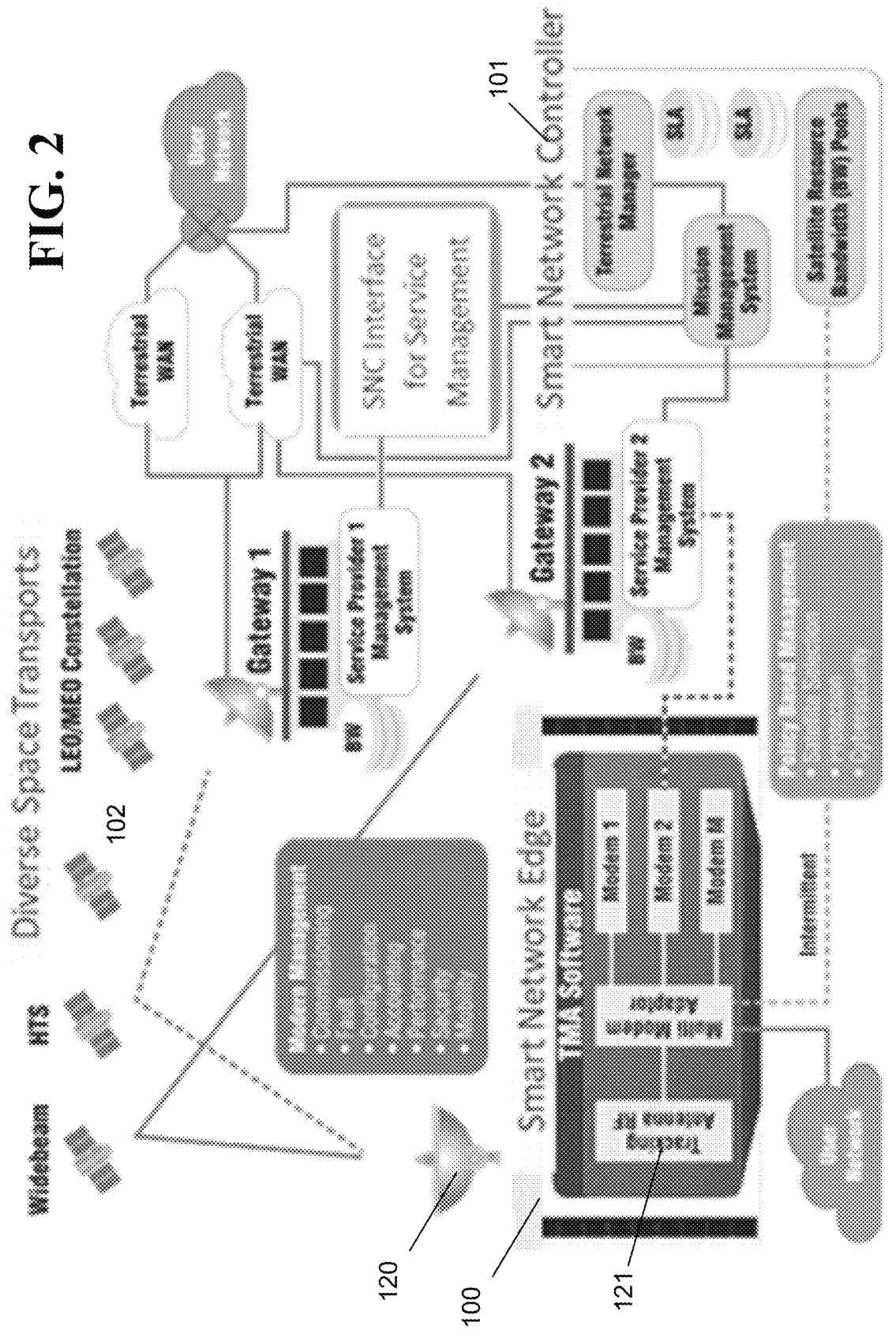
FIG. 2 illustrates an example system incorporating Smart Network Edge for Multi-Transport Resiliency.

FIG. 2 illustrates additional detail regarding a Smart Network Edge 100 and its environment. Antenna 120: A low-cost ESA with optimal performance and SWaP-C features is feasible, at least for a specific band (e.g., Ku band for both LEO and GEO).

Antenna Control 121: A rudimentary analysis of the two LEO systems has identified significant reuse of the OpenAMIP type antenna control interface widely used for the GEO systems. A software engine with OpenAMIP type primitives and translations for specific LEO and GEO systems (either table based or rules-based flexibility) is used in SNE.

Physical layer (PHY) and Medium Access Control Layer (MAC): The use of proprietary stacks across LEO and GEO systems warrants a reuse of the current implementation (mostly with System on a Chip [SoC] with low SWaP-C) that can be packaged together on a single digital board. However, the use of proprietary SoC and networks creates additional network, service, and management layer implications for network level traffic routing, service management, and business arrangements. This is addressed in the solution presented herein.

Network Layer: IP, similar to other parts of the Internet, is pervasive within the satellite industry, and it enables interoperable software-centric (for GPU and FPGA) smart edge implementation. Significantly reduced integration and customization is possible with modem adaptive software engines running on low-SWaP-C general-purpose computers within SNE for tunnelling, load distribution, and Quality of Service (QoS).

Service Management: The reuse of multiple SoCs for PHY and MAC layer functions dictates how traffic is routed from the edge to the Internet via the modem-gateway of each transport provider. Dynamic service selection (data rate. QoS, price, etc.) is now possible with the availability of APIs on their respective management systems. The Smart Network Controller (SNC) has individual management-level integration with various system operators and service providers for dynamic service configuration. The SNC can provide customized rules, policies, and parameters to an SNE so that it can select the right transport (and provider) based on metrics such as price, location, type of service, availability, and QoS objectives. The SNE-SNC interface is at the application layer (over user-plane transports) and can be intermittent (see FIG. 2).

Resiliency and Efficiency: Smart edge benefits from current SD-WAN capabilities where the performance of multiple transports is continuously measured to enable packet-level use of one or more transports. This helps in significantly improving resiliency (availability), efficiency, and affordability while leveraging coverage, capacity density, latency, and cost-per-bit objectives for an SNE. Smart edge software provides a well-defined, tunneled virtual link between the edge and customer endpoint, even though individual packets may traverse diverse routes across various gateways and networks. SD-WAN-based layering significantly reduces routing and traffic engineering (re)configurations if used at the network level.

Figure 3:
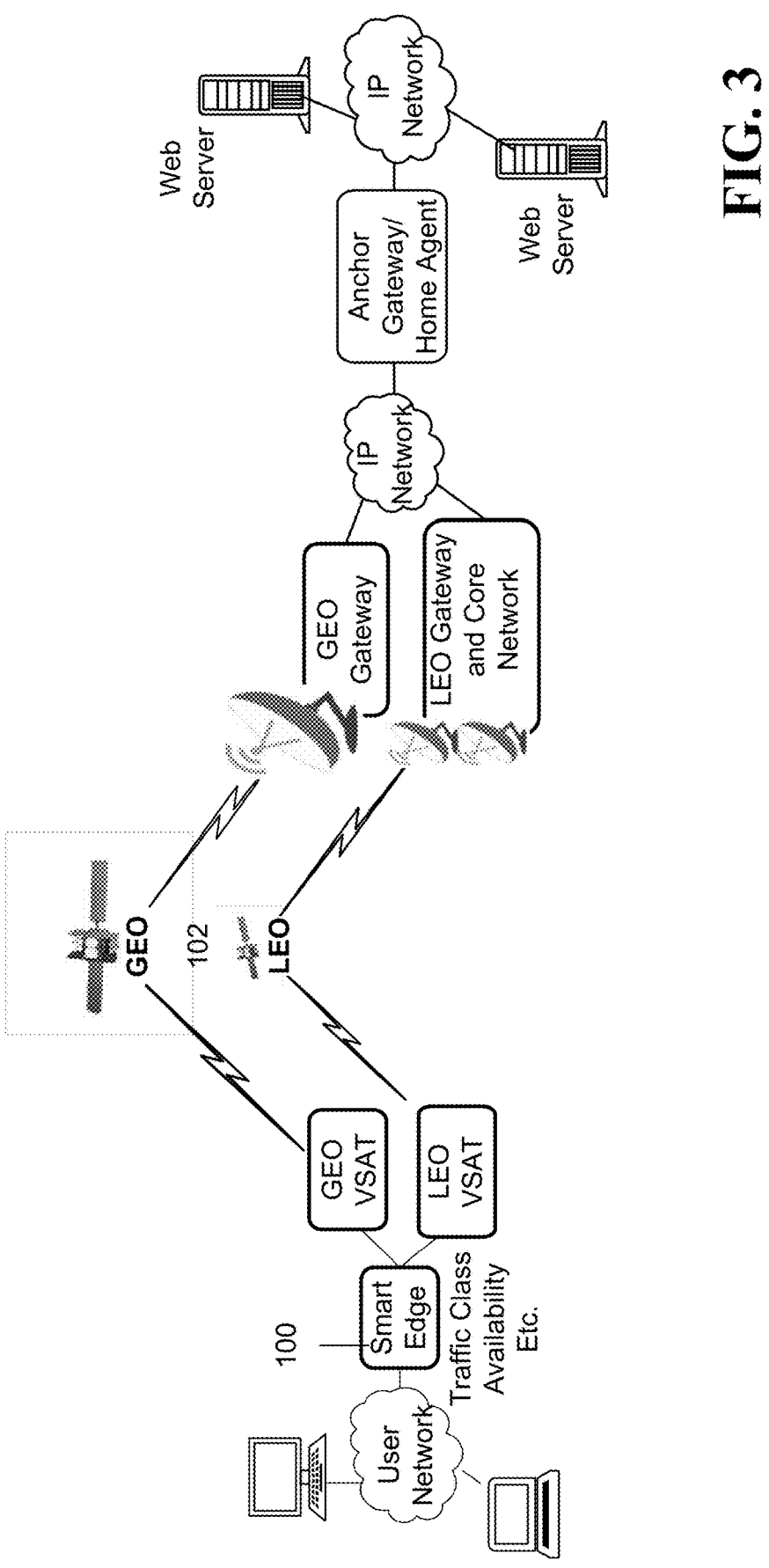
FIG. 3 illustrates an example for Dual Connectivity with Hybrid LEO/GEO Systems.

FIG. 3 illustrates dual connectivity via GEO and LEO constellations 102. Unlike the Dual Connectivity/Multi Connectivity framework described in 3GPP TS 37.340, these two networks are designed independently of each other and have their own protocol stacks. The SNE 100 provides SNE functionality in VSAT to determine the optimal path for a given flow and direction based on a set of rules configured in VSAT. For example, packets belonging to latency sensitive traffic may be routed via the LEO and latency insensitive and bulk traffic may be routed via GEO system. SNE functionality also includes the determination of availability of the two paths and when one path is unavailable, all traffic is routed via the available path.

Figure 4:
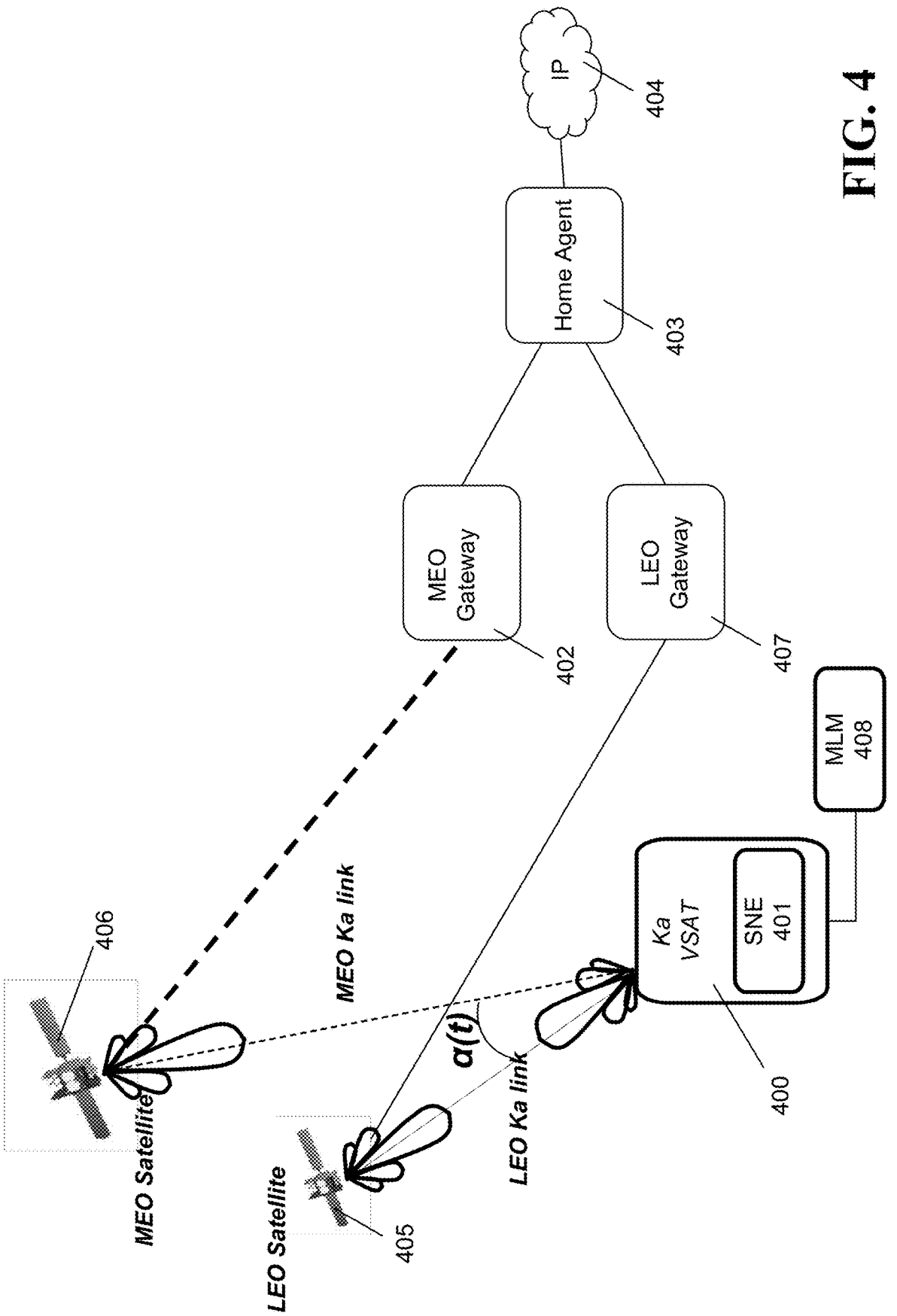
FIG. 4 illustrates LEO/MEO interference.

FIG. 4 illustrates the operation of a SNE 401 incorporated in a Ka-band VSAT, for example, will be described. Generally, the function of the SNE 401 is to determine via what path a data packet should be routed to a destination, represented in FIG. 4, as the Internet Protocol (IP) network 404. Generally, a terrestrial network will transfer data more quickly while a satellite network will transfer data with a greater latency. Different data may have different Quality of Service (QoS) requirements. Specifically, some data may be insensitive to a slight delay in transmission, whereas other data types are more sensitive. Some examples of different data types and corresponding delay sensitivities are as follows:

Real-Time Communication: Data types such as voice and video calls require low latency to ensure real-time interaction. Any significant delay can disrupt the conversation and degrade the user experience.

Video Streaming: Streaming services deliver video content over the internet. They have strict QoS requirements as delays or buffering can lead to interruptions and decreased video quality. Smooth playback and minimal buffering are crucial for a satisfactory user experience.

Online Gaming: Multiplayer online games demand low latency to provide real-time responsiveness to player actions. High latency can result in lag and negatively impact gameplay. Gainers often prioritize low latency over other factors, such as bandwidth.

Financial Transactions: In the financial sector, transactions involving electronic payments or stock trading require low latency and high reliability. Delays can have significant financial consequences, and data integrity is crucial to prevent errors or fraud.

IoT Applications: Internet of Things (IoT) devices, such as sensors and actuators, generate and exchange data. Some IoT applications, like industrial control systems or autonomous vehicles, require low-latency communication to ensure timely responses and avoid accidents or system failures.

File Downloads: Downloading large files, such as software updates or multimedia content, might not have strict delay sensitivity but can benefit from higher bandwidth to complete the download faster.

It's important to note that the QoS requirements and delay sensitivities can vary based on specific applications and user expectations. Different industries and contexts may have additional examples or variations in data types and their associated requirements. The SNE will choose a path, i.e., transmission network(s), based at least in part on the QoS requirements of the data being handled.

A significant issue for the SNE is interference between different constellations of satellites. Each system of satellites, operated by a single entity, is referred to as a constellation. Inter-constellation Interference Handling involves handling of Mega-constellations being proposed by multiple operators in multiple orbits and multiple bands.

For LEO and MEO constellations that are not in geosynchronous orbit, the position of the satellites in the constellation as viewed from a VSAT on earth is constantly changing. Because of the proliferation of different constellations, noted above, two non-geosynchronous satellites from different constellations may periodically move into conjunction or appear very close to each other from the perspective of a fixed point on earth or a non-geosynchronous satellite may move in front of or close to being in front of a geosynchronous satellite. In such a state, attempted communications between a terrestrial terminal and one of the satellites may experience interference from the other satellite.

As more constellations are deployed, it is important to manage and mitigate interference across systems. To date, the primary focus has been to mitigate interfering with satellites in GEO-ARC as required by ITU-T Article 22. Such mitigations have typically led to NGSO (Non-Geo-Stationary Orbit) operators agreeing to maintain a GEO-Arc avoidance angle threshold. Here the NGSO terminals and gateways are obligated to not transmit if the angle to the GEO arc is less than a threshold. However, the issue of interference between NGSO systems becomes increasingly important and complex with Mega-constellations where there is no equivalent to a fixed GEO arc against which the avoidance angle can be evaluated.

One such example is illustrated in FIG. 4. As shown in FIG. 4, there is an LEO constellation with satellites 405. The LEO satellite 405 provides communication between a user VSAT 400 and an LEO gateway 407. Additionally, there is an MEO constellation with satellites 406. The MEO satellite 406 provides communication between the user VSAT 400 and an MEO gateway 402. Both gateways 407, 402 communicate through a home agent 403 with a destination network 404. e.g., an Internet Protocol network. In this example, $\alpha(t)$ is the separation angle between the LEO satellite 405 and MEO satellite 406 as seen by the VSAT 400. This angle will constantly change as a function of time as both LEO and MEO constellations are moving with respect to the VSAT 400. Below a lower threshold of the angle $\alpha(t)$, the VSAT 400 will experience interference between the two satellites if trying to communicate with either one.

In the SNE 401 described here, the path chosen for a data stream by the SNE will also take into account any possible interference occurring at the time of transmission that may be happening between the satellites of different constellations. The SNE may avoid selecting a transmission path that would experience interference or may take action to mitigate the interference. In the example of FIG. 4, if $\alpha(t)$ is small enough that there is interference between the constellations, the SNE 401 may select a different data path that does not include either of the interfering satellites, i.e., a terrestrial data path or a path include a different satellite not experiencing interference.

Alternatively, the SNE 401 may utilize one of the interfering satellites, but mitigate the interference. To this end. SNE 401 implements smart sidelobe suppression techniques using phased array antennas in the terminal 400. Sidelobe suppression refers to the reduction or mitigation of unwanted signal components or energy that appear outside the main lobe of a signal's radiation pattern or spectrum. If there is some reasonable angular separation between satellites, these sidelobes are what will cause the inter-constellation interference and degrade communication with the VSAT 400. The primary goal of sidelobe suppression is to minimize the power or energy present in these sidelobes while preserving the desired signal in the main lobe that is centered on the satellite being linked. These main lobes and side lobes are illustrated in FIG. 4. Both the VSAT 400 and the satellites 406,406 have main and side lobes. Thus, side lobe suppression is performed by the VSAT 400 for both transmitting and receiving to mitigate interference.

Various signal processing techniques have been used for side lobe suppression, such as:

Windowing: Applying a mathematical window function to the signal can attenuate the sidelobes. Different window functions, such as Hamming or Blackman, are used to balance the trade-off between the main lobe width and sidelobe suppression.

Beamforming: In array signal processing, beamforming algorithms are employed to focus the transmitted or received signal towards the desired direction while suppressing sidelobes in other directions. Adaptive beamforming techniques can dynamically adjust the array weights to enhance the main lobe and attenuate sidelobes.

Nulling: Nulling refers to creating nulls or deep dips in the radiation pattern of an antenna array to suppress signals coming from specific directions. By adjusting the phases and amplitudes of the signals at each antenna element, unwanted signals can be cancelled out in particular directions.

Filtering: Digital filters can be employed to suppress sidelobes in the frequency domain. Various filter designs, such as finite impulse response (FIR) or infinite impulse response (IIR) filters, can be used to shape the frequency response and reduce the power of unwanted frequency components.

In particular, Taylor tapering, also known as Taylor windowing or Taylor weighting, is a technique used for sidelobe suppression. Taylor tapering involves applying a specific amplitude distribution or tapering to the elements of an antenna array to reduce the sidelobe levels in the radiation pattern. The Taylor tapering technique is based on the concept of using a Taylor series expansion to approximate the desired window function. The goal is to design a tapering function that achieves a balance between narrowing the main lobe and suppressing the sidelobes. The tapering coefficients are calculated based on the desired sidelobe level and the width of the main lobe. The coefficients are determined by solving a set of equations derived from the desired specifications. The resulting tapering function is then multiplied with the signal at each element of the antenna array to shape the radiation pattern. The main advantage of Taylor tapering is its ability to provide a trade-off between main lobe width and sidelobe suppression. By adjusting the parameters of the tapering function, the designer can control the width of the main lobe and the level of sidelobe suppression according to specific requirements. Compared to other windowing functions like the rectangular, Hamming. or Blackman windows, the Taylor tapering technique can achieve lower sidelobe levels and sharper main lobes.

Sidelobe suppression is subject to the conservation of energy. Thus, when the sidelobes are suppressed, the energy from those sidelobes is added to the main lobe. As a result, the main lobe becomes wider and less focused. By applying the tapering or other sidelobe suppression techniques to only a portion of the signal, a targeted sidelobe suppression is achieved that mitigates interference while also minimizing distortion of the main lobe.

Thus, the SNE 401, described herein, uses two techniques to improve over traditional uniform sidelobe suppression. The first is smart or targeted sidelobe suppression where only sidelobes significantly contributing to inter-constellation interference are suppressed to improve the efficiency of the interference mitigation. The second is utilizing machine learning to determine when sidelobe suppression will be needed.

As illustrated in FIG. 4, the VSAT 400 will include or have access to a Machine Learning Model 408 to predict the likely occurrence of interference events to/from unwanted NGSO satellites as a function of the time of day. Knowledge of the ephemeris of the satellites of all deployed constellations would allow calculation of likely interference events. But, given the volume of such satellites and their different trajectories, this would not be practical. Therefore, the VSAT 400 trains the MLM 408 to predict interference events over time. The MLM 409 is provided with a training set in which variables such as current time and satellite position data are paired with a determination of whether interference is or is not occurring. Over time, the MLM 408 is then able to take an input of current conditions and output a prediction of whether inter-constellation interference will occur and needs to be addressed. This learning or training can be performed during Idle Mode periods by performing a sky scan. Subsequently, during interference events as predicted by the MLM 408, sidelobe suppression is invoked using tapering techniques.

Figure 5:
FIG. 5 illustrates an example of directivity loss due to tapering.

In addition to machine learning, the SNE 401 uses targeted sidelobe suppression to mitigate inter-constellation interference. As noted above, sidelobe suppression is subject to the conservation of energy. When the sidelobes are suppressed, the energy from the sidelobes is added to the main lobe. As a result, the main lobe becomes wider and less focused. Specifically, it is known that classical tapering techniques, such as Taylor tapers mentioned above, will result in a loss of directivity of the main beam as a function of the chosen sidelobe level. This is illustrated in FIG. 5. Therefore, a constrained optimization problem of trying to achieve a desired amount of sidelobe suppression by constraining the directivity loss to less than a threshold is used.

Figure 6:
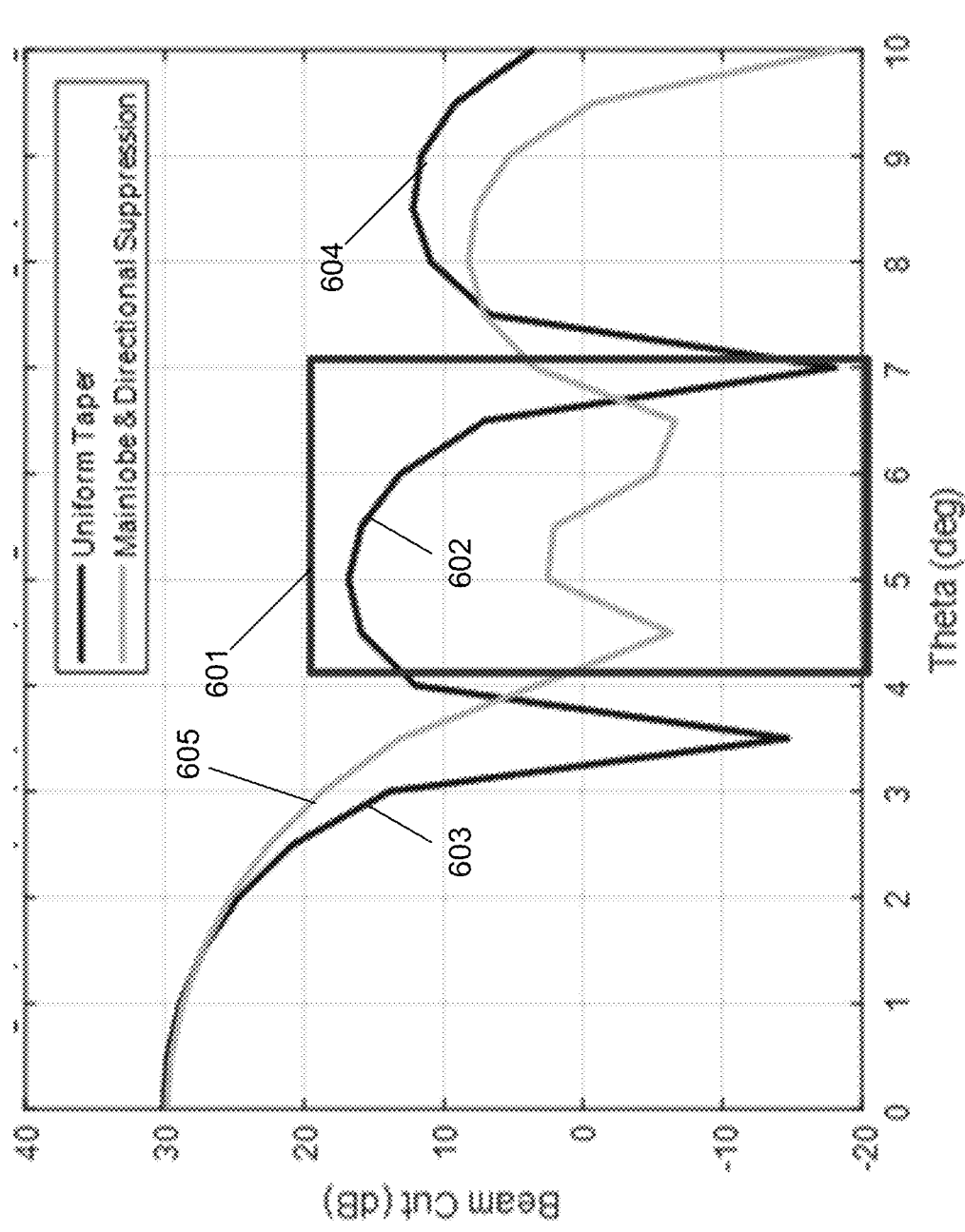
FIG. 6 illustrates an example of sidelobe suppression with minimal loss in directivity.

FIG. 6 illustrates the result of such an optimization. The rectangle 601 in FIG. 6 indicates a region of interest in which a sidelobe 602 adjacent the main lobe 603 is likely to cause interference, whereas additional sidelobes 604, further from the main lobe 603, are not likely to cause significant interference. Accordingly, sidelobe suppression is performed on the sidelobe 602 and not uniformly on all sidelobes. Curve 605 illustrates the lobes after the targeted suppression of sidelobe 602. The result is a significant suppression in the sidelobe that is in rectangle 601, with only modest increase of the width of the main lobe. In the illustrated example, a 30 dB main lobe level is achieved with less than 0.2 dB of directivity loss (compared to 1.4 dB of directivity loss with Taylor taper for the same sidelobe level).

While this example illustrates suppressing a sidelobe immediately adjacent to the main lobe, it may be another sidelobe, further from the main lobe, that will cause interference and should be targeted for suppression. It should be noted that these sidelobe suppression techniques are more effective when suppression is attempted away from the main lobe. Creating a suppression near the peak in the main lobe clearly distorts the main lobe and C/N of the link and is therefore not recommended.

If the angle between the satellite of interest, with which the VSAT is communicating, and the interfering satellite is within the main lobe, targeted suppression will be unlikely to mitigate the interference. This is because the distortion to the main lobe resulting from the targeted suppression within the main lobe will significantly degrade the communication with the satellite of interest.

Additionally, in the proposed hybrid system, it is possible for SNE 401 to choose a path that is not interfering in the main lobe and communicate with all other remaining available paths. To further minimize the probability of losing packets arriving from the internet on a downlink path (also referred to as "forward path" in satellite domain), the SNE 401 provides appropriate binding instructions to the Home Agent 403 to route packets that were going to be delivered by the interference-affected path to an alternate path.

Figure 7:
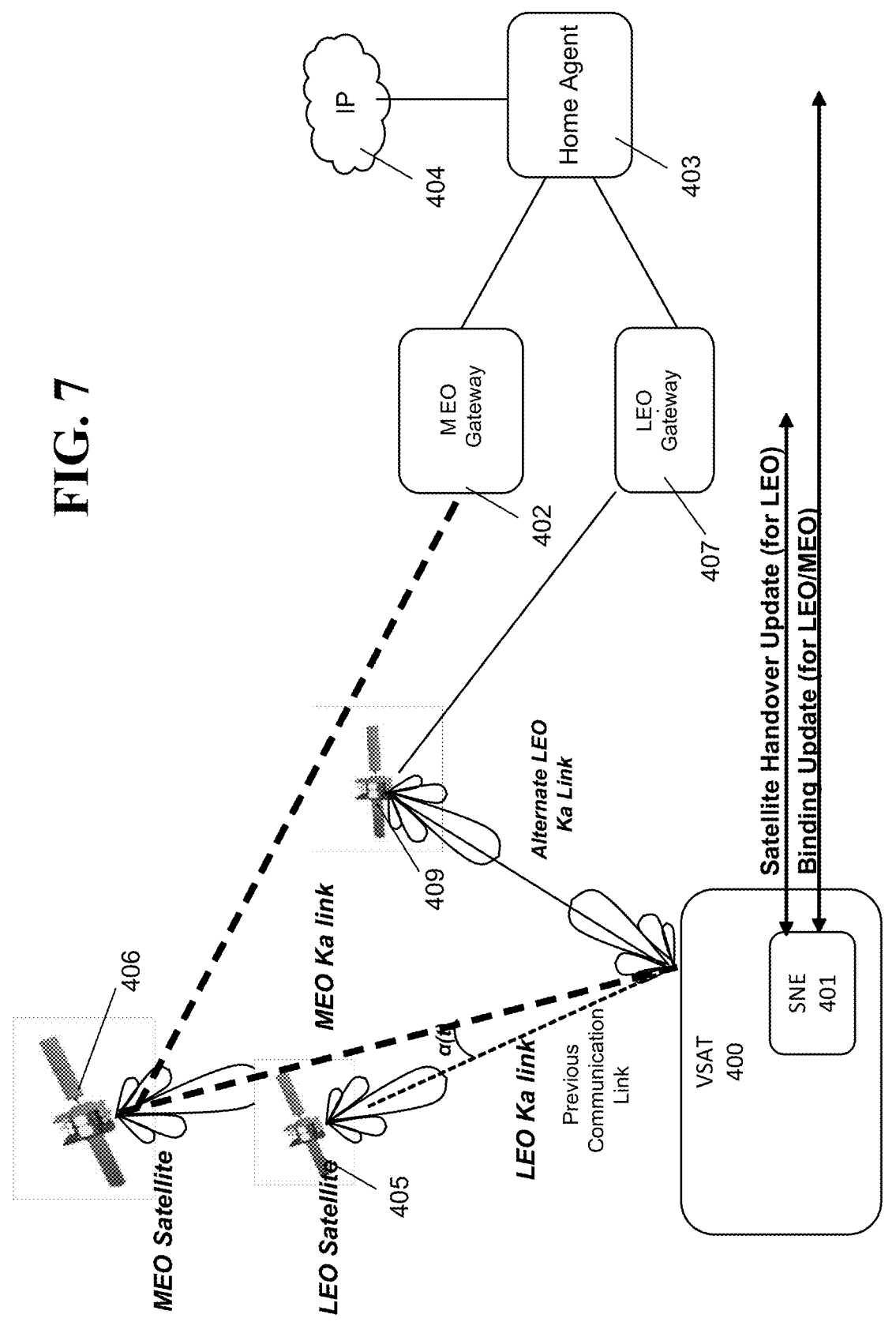
FIG. 7 illustrates an example of alternate muting for inline events.

As illustrated in FIG. 7, the VSAT 400 is originally communicating with LEO satellite 405. However, during the transmission, MEO satellite 406 moves such that the separation angle $\alpha(t)$ is small enough that interference between satellites 405 and 406 will occur. This angle $\alpha(t)$ may also become so small that targeted sidelobe suppression, as described above, will not effectively mitigate the interference. In this case, the SNE 401 will identify another path, using satellite 409, that is currently free from interference. As shown in FIG. 7, satellite 409 is sufficiently separate from the original communication path with satellite 405 that no interference with either satellite 405 or 406 will occur or that targeted sidelobe suppression will be effective to secure communication without interference.

To affect the handover to the communication path with satellite 409, the SNE 401 communicates the handover to the LEO gateway 407 or other gateway corresponding to the satellite 409 of the new data path. This is an instruction to the LEO gateway 407 to use the new satellite path. i.e., via satellite 409, for all the data packets addressed to the VSAT 400. The SNE 401 also communicates the handover to the home agent 403. This is an instruction to the home agent 403 to route the data packets addressed to the VSAT 400 are sent through the LEO gateway 407 that serves the selected satellite path, i.e., satellite 409.

As will be noted later, the SNE 401 includes a number of different modems. Each modem corresponds to and provides communication with a particular gateway (e.g., 402 and 407). The SNE 401 will utilize the appropriate modem depending on the gateway that is in the chosen data path. Again, the data path is chosen based on a number of factors, including the QoS requirements of the data, whether there is interference in a potential data path, and whether any interference in the potential data path can be mitigated.

The SNE 401 of the present description can also promote battery conservation. In some settings, there will be a use cases or a community of users whose user terminals will be battery operated and/or solar powered. A typical user terminal, e.g., VSAT, is continuously listening on the downlinks to determine if there is any data for it. User terminals with phased arrays can consume significant power and drain battery when continuously receiving without knowing whether data for it is actually present or not.

Air interface protocols based on 4G-LTE and 5G-NR have a concept of connected mode DRX (Discontinuous Reception) whereby user terminals wake up periodically (as dictated by a DRX period) and look for possible incoming data. For example, the user terminal may wake to check for incoming data only every 2 or 3 seconds and be on, checking for incoming data, for 20 milliseconds. The gateways manage the schedule for when a user terminal is waking up to check for incoming data and only transmit data for that terminal during the time their terminal is schedule to be awake. One aspect of a smart network edge is for a modem that is aware of the DRX cycle to power down the electronics during the OFF periods of the DRX cycle, including the antenna sub-system.

However, the DRX cycle that is determined by the network may not be optimal for the user terminal, especially when the battery status starts to get low. If the battery is sufficiently low, the user terminal may need to wake even less frequently than the current DRX cycle dictates in order to better conserve the waning battery power. Thus, the SNE 401 is further programmed to report battery status to the network. As a result, the network will change the DRX cycle for the user terminal to provide, for example, more OFF time between ON cycles and/or shorter ON cycles. This can be done in conjunction with Power Headroom (PHR) reporting that is typically done in the MAC layer in 4G and 5G based networks or at the RRC layer. Depending on the reported battery status, the network provides a new DRX parameter to the user terminal to conserve its battery. Network schedules packets for this user terminal based on the new DRX value.

Figure 8:
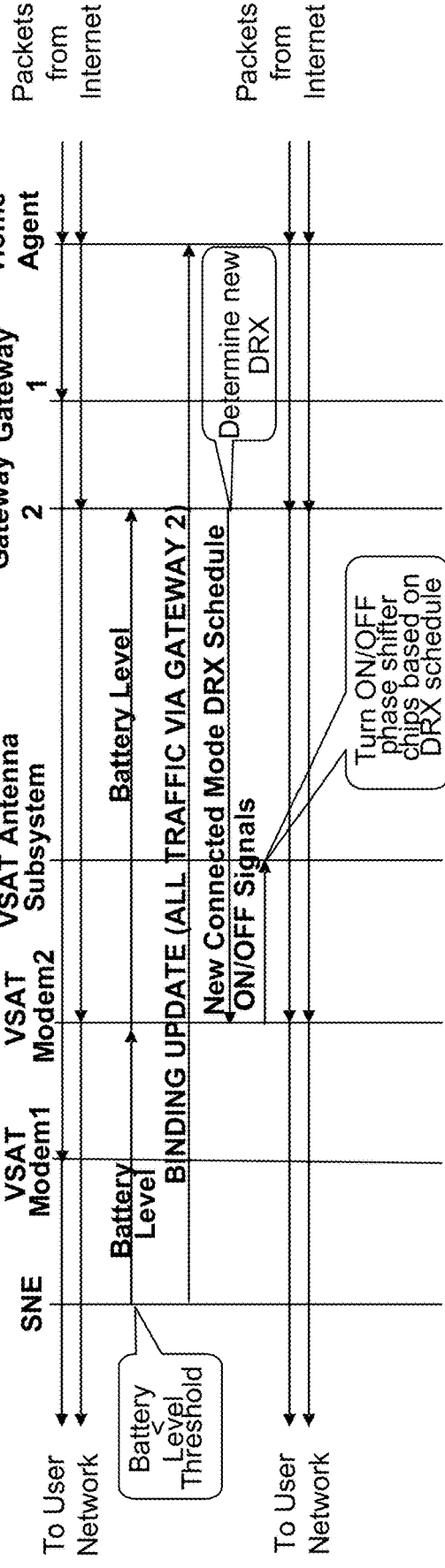
FIG. 8 illustrates an example of battery conservation with Smart Network Edge

As part of the decision-making process, the SNE 401 also takes into account the battery status of the user terminal in choosing the communication path from the available paths. When battery status is low, the SNE 401 will prefer a data path whose air interface capabilities support DRX or that support the adaptive DRX feature described above so that the battery could be used more efficiently. An example of this is illustrated in FIG. 8.

The description will now address Direct Sessions for Secure Communications. An important use case in certain communities of users is the capability to establish and maintain data sessions directly with each other without data touching the ground. In the context of FIG. 7, this means that the data from a satellite bypasses any terrestrial gateway or home agent and is delivered directly to the destination user terminal, i.e., a VSAT.

To this end, 3GPP (for example 3GPP TS 23.304, V17.3.0) has defined Direct communication feature as part of the Proximity Services (ProSe). ProSe capable user terminals can communicate directly over the PC5 interface. However, for user terminals communicating with mega-constellations, the SNE has to incorporate additional features compared to that described in 3GPP TS 23.304. This is because the two user terminals involved could be communicating with two different satellites in the constellation and these satellites have to be capable of communicating with each other via inter-satellite links. Routes have to be established via inter-satellite links between the two user terminals. In addition, for NGSO, the beams and satellites of the two user terminals keep frequently changing due to handovers—this implies that the routes between two user terminals need to be updated. This is addressed in the current disclosure by augmenting the SNE functionality to first establish security association between the two user terminals after discovery has been completed. SNE functionality is further augmented to update each user terminal about the beam and satellite that the other user terminal is handing off to.

A user terminal can simultaneously be in both an indirect session and a direct session. In the indirect session, data packets are being routed as described above through gateways, agents and other terrestrial components. In the direct session, data packets are being routed directly from a transmitting user terminal, through a satellite constellation, to a recipient user terminal without being routed through any other terrestrial components where they might be intercepted. Thus, for example, a user could be downloading data or streaming content in an indirection session while simultaneously communicating in a direct session with another user for privacy. Thus, the SNE 401 and the components of selected data paths will need to route packets belonging to a direct session and an indirect session accordingly.

The SNE 401, described herein, will support both types of sessions, direct and indirect. Specifically, the SNE 401 will add a routing label before transmitting packets in a direction session to the satellites. This routing label will instruct transmission of the packets directly to a user terminal of the recipient.

Figure 9:
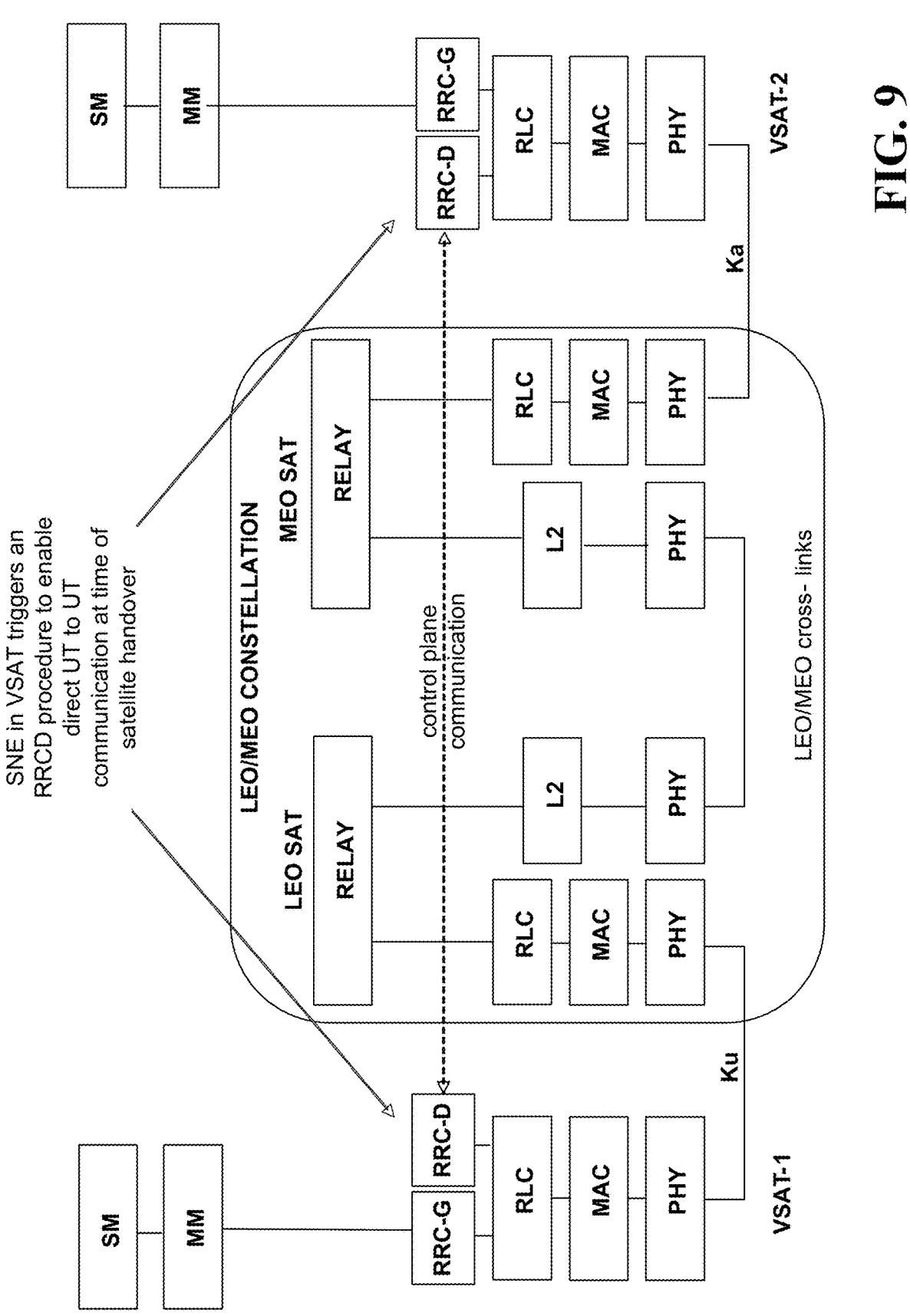
FIG. 9 illustrates an example of control plane interactions for direct session with SNE.

This is illustrated in FIG. 9. As shown in FIG. 9, a first user terminal (VSAT-1) is communicating directly with a second user terminal (VSAT-2) directly via satellites (e.g., the LEO/MEO Constellation) without any intervening gateways. It is important to note that the two VSATs need not be operating in the same band—as illustrated in FIG. 9 the two VSATs may be operating in two completely different bands (in this example Ku and Ka bands In this example, each user terminal in FIG. 9 and each satellite has a classical protocol stack including a physical layer (PHY), a Medium Access Control (MAC) layer and a Radio Link Control (RLC) layer. Each user terminal also includes a Mobility Management (MM) layer and a Session Management (SM) layer in the stack. Each satellite also includes a Layer 2 (L2) as in a typical ethernet stack. Each terminal also includes a Radio Resource Control for Gateway (RRC-G) and Radio Resource Control for Direct Communication (RRC-D). The RRC-G allows a terminal to obtain allocation of resources needed for communication by contacting the appropriate gateway. In an indirect session, once resources are allocated, data packets are sent via the appropriate gateway. In a direct session, once resources are allocated by the gateway, the RRC-D is used to label and route data packets directly to another user terminal.

As noted above, there may be instances in which a data path needs to be handed from one satellite to another or from one constellation to another. This may happen when an interference event occurs due to the relative movement of the satellites. In such a case, the RRC-D at one terminal (e.g., VSAT-1) will use the control plane communication and the RRC-D of the other terminal (e.g., VSAT-2) to notify the SNE in VSAT-2 of the handover. Then the SNE in VSAT-2 will add a routing label to data packets in a direct session with VSAT-1 that reflects the new data path. For example, if the direct session between VSAT-1 and VSAT-2 has been handled by Satellite A and VSAT-1 determines that the data path needs to be moved to Satellite B, the SNE in VSAT-1 will notify the SNE in VSAT-2 using the RRC-D of the change to Satellite B. Thereafter, the SNE in VSAT-2 will adjust its antenna to communicate with Satellite B and will add the routing label to data packets in the direct session so that the packets are transmitted directly to Satellite B and from Satellite B to VSAT-1 to secure the direct session.

Hybrid LEO/MEO/GEO/Terrestrial architectures are gaining increasing importance due to their ability to provide improved quality of experience and greater availability. However, this requires use of a smart network edge that determines the different path(s) to be selected for multiple simultaneous sessions. This disclosure introduces the functions needed on the smart network edge on the user terminal side for different use cases and in different interference environments in hybrid architectures with mega-constellations.

Figure 10:
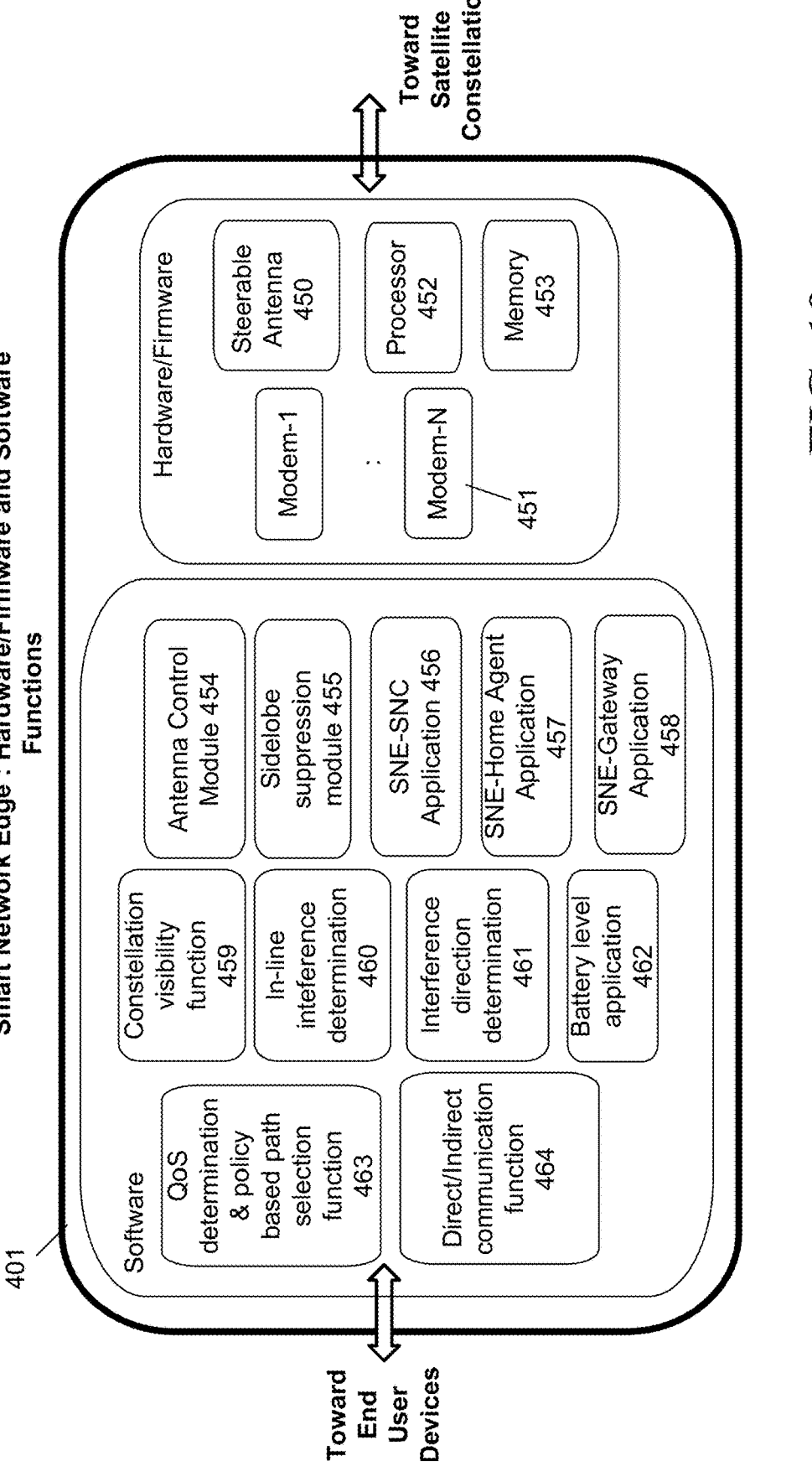
FIG. 10 illustrates an example of the Smart Network Edge according to the principles described herein.

FIG. 10 illustrates an example of a Smart Network Edge 401, as described herein. As shown in FIG. 10, the SNE 401 includes both software and hardware/firmware. The hardware/firmware includes a processor 452, which may be a single processor or a number of processor cores. The hardware/firmware also includes memory 453 for storing the programming executed by the processor. The hardware/firmware also includes a number of modems 451. As noted above, each modem 451 can correspond to a different gateway that might be used in a data path selected by the SNE 401. The hardware/firmware also includes an electronically steerable antenna 450. This may be a phase array antenna, as noted above. In some examples, some or all of the hardware/firmware is embodied as a system on a chip (SOC).

The software of the SNE 401 reflects programming stored in the memory 453 and includes the following. An antenna control module 454 controls the antenna 450. In a DRX scenario, as described above, the antenna control module 454 will power down the antenna 450 and related components to conserve power. The software further includes a sidelobe suppression module 455. As described above, this module 455 will perform a targeted suppression of a sidelobe that has been determined likely cause or to be the cause of interference with a satellite that is outside of the selected data path.

The SNE-SNC application 456 provides communication between the SNE and the Smart Network Controller, as described above. The SNE-Home Agent application 457 communicates the data path routing determination made by the SNE to the Home Agent, as described above. In this way, the Home Agent can route data packets to the appropriate gateway that is part of the SNE-selected data path. Similarly, the SNE-Gateway application 458 communicates the data path routing determination to the appropriate gateway so that that gateway utilizes the satellite selected by the SNE for the data path.

The constellation visibility function 459 communicates with the machine learning model, as described above, to provide the training data on which the machine learning model is trained. The in-line interference determination function 460 determines when in-line interference is occurring. The interference direction determination function 461 determines whether a targeted sidelobe suppression will mitigate interference. The battery level application 462 determines the battery level (if operating on battery power) of the user terminal and communicates that battery level to the network. As described above, this allows a network with adaptive DRX capability to adjust the OFF/ON cycle of the user terminal to adaptively conserve battery power as the battery power continues to deplete.

The QoS determination and policy based path selection function 463 selects a data path based on the QoS needs of the data in a respective session, as described above. The direct/indirect communication function 464 determines whether the session is direct or indirect so that a data path can be controlled accordingly.

Collectively, the functions and applications of the SNE 401 allow the SNE 401 to select a data path based on a number of considerations. Specifically, the SNE 401 will select a data path based on (1) QoS requirements for the data, (2) lack of or ability to mitigate inter-constellation interference and (3) the need for and availability of adaptive DRX capability. The SNE 401 may use these same criteria in either an indirect or direct session when determining an optimal data path.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing detailed description, numerous specific details were set forth by way of examples in order to provide a thorough understanding of the relevant teachings. It will be apparent to persons of ordinary skill, upon reading the description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A smart network edge (SNE) for selectively routing data packets via an optimal data path using available networks, either terrestrial or non-terrestrial, the SNE comprising:
   a processor;
   a memory storing programming for the processor;
   a steerable antenna controlled by the processor;
   a number of modems corresponding to gateways in the available networks for providing communication between the SNE and gateways;
   the processor, alone or in combination with other processors when executing the programming stored in the memory, cause the SNE to determine one or more selected data paths for data packets of a session based on avoiding or mitigating inter-constellation interference.

2. The SNE of claim 1, wherein the SNE is programmed to further determine the one or more selected data paths based on Quality of Service (QoS) requirements of the session.

3. The SNE of claim 1, further comprising a machine learning model trained to predict inter-constellation interference.

4. The SNE of claim 1, further comprising an SNE-home agent application for directing a home agent in a selected data path to route the data packets of the session according to the selected data path.

5. The SNE of claim 1, further comprising an SNE-gateway application for directing a gateway in a selected data path to route the data packets of the session according to the selected data path.

6. The SNE of claim 1, wherein the SNE is programmed to determine the one or more selected data paths based on support for Discontinuous Reception (DRX).

7. The SNE of claim 1, wherein:
   the SNE is programmed to report a battery level of a user terminal to a network supporting the one or more selected data paths; and
   the SNE is programmed to determine the one or more selected data paths based on the battery level of the user terminal and availability of adaptive Discontinuous Reception (DRX) that responds to the battery level reported by the SNE.

8. The SNE of claim 1, further comprising a sidelobe suppression module to mitigate interference by selectively suppressing only a specific sidelobe identified as a potential cause of inter-constellation interference.

9. The SNE of claim 1, further comprising:
   a Radio Resource Control for gateways (RRC-G); and
   a Radio Resource Control for direct sessions (RRC-D),
   wherein the SNE is programmed to use the RRC-G to obtain allocation of resources for a direct session and the RRC-D to conduct the direct session between two user terminals without routing the data packets through a terrestrial gateway.

10. A smart network edge (SNE) for optimized routing of data packets by selectively using available networks, the SNE comprising:
   a processor;
   a memory storing programming for the processor;
   a steerable antenna controlled by the processor;
   a Radio Resource Control for gateways (RRC-G); and
   a Radio Resource Control for direct sessions (RRC-D),
   the processor programmed to, alone or in combination with other processors, use the RRC-G to obtain allocation of network resources for a direct session between two user terminals and the RRC-D to conduct the direct session,
   wherein, in the direct session, the SNE routes the data packets between the two user terminals via a satellite network and avoiding any terrestrial gateway.

11. The SNE of claim 10, the SNE to determine one or more selected data paths for the data packets of the direct session based on avoiding or mitigating inter-constellation interference.

12. The SNE of claim 11, further comprising a machine learning model trained to predict inter-constellation interference.

13. The SNE of claim 11, further comprising a sidelobe suppression module to mitigate interference by selectively suppressing only a specific sidelobe identified as a potential cause of inter-constellation interference.

14. The SNE of claim 11, the SNE programmed to use the RRC-D to advise a user terminal of a handover of the data path from a first satellite to a second satellite.

15. A method for selectively routing data packets via an optimal data path using available networks, either terrestrial or non-terrestrial, the method comprising, with a Smart Network Edge (SNE) comprising a processor, a memory storing programming for the processor, a steerable antenna controlled by the processor and a number of modems corresponding to gateways in the available networks for providing communication between the SNE and gateways:

determining potential for inter-constellation interference when communicating with a first satellite in a first constellation by a second satellite in a second constellation; and selecting one or more selected data paths for the data packets of a session based on avoiding or mitigating the inter-constellation interference.

16. The method of claim 15, wherein determining potential for inter-constellation interference comprises utilizing a trained machine learning model to predict inter-constellation interference.

17. The method of claim 15, further comprising determining the one or more selected data paths based on support for Discontinuous Reception (DRX).

18. The method of claim 15, further comprising:

reporting a battery level of a user terminal to a network supporting the one or more selected data paths; and determining the selected data path based on the battery level of the user terminal and availability of adaptive Discontinuous Reception (DRX) that responds to the battery level reported.

19. The method of claim 15, further comprising mitigating inter-constellation interference by selectively suppressing only a specific sidelobe identified as a potential cause of inter-constellation interference.

20. The method of claim 15, wherein the method further comprises:

obtain allocation of resources for a direct session; and conducting the direct session between two user terminals without routing the data packets through a terrestrial gateway.

* * * * *